March 5, 1940. J. A. COURVILLE 2,192,767
JACKING APPARATUS
Filed Jan. 6, 1938 3 Sheets-Sheet 1
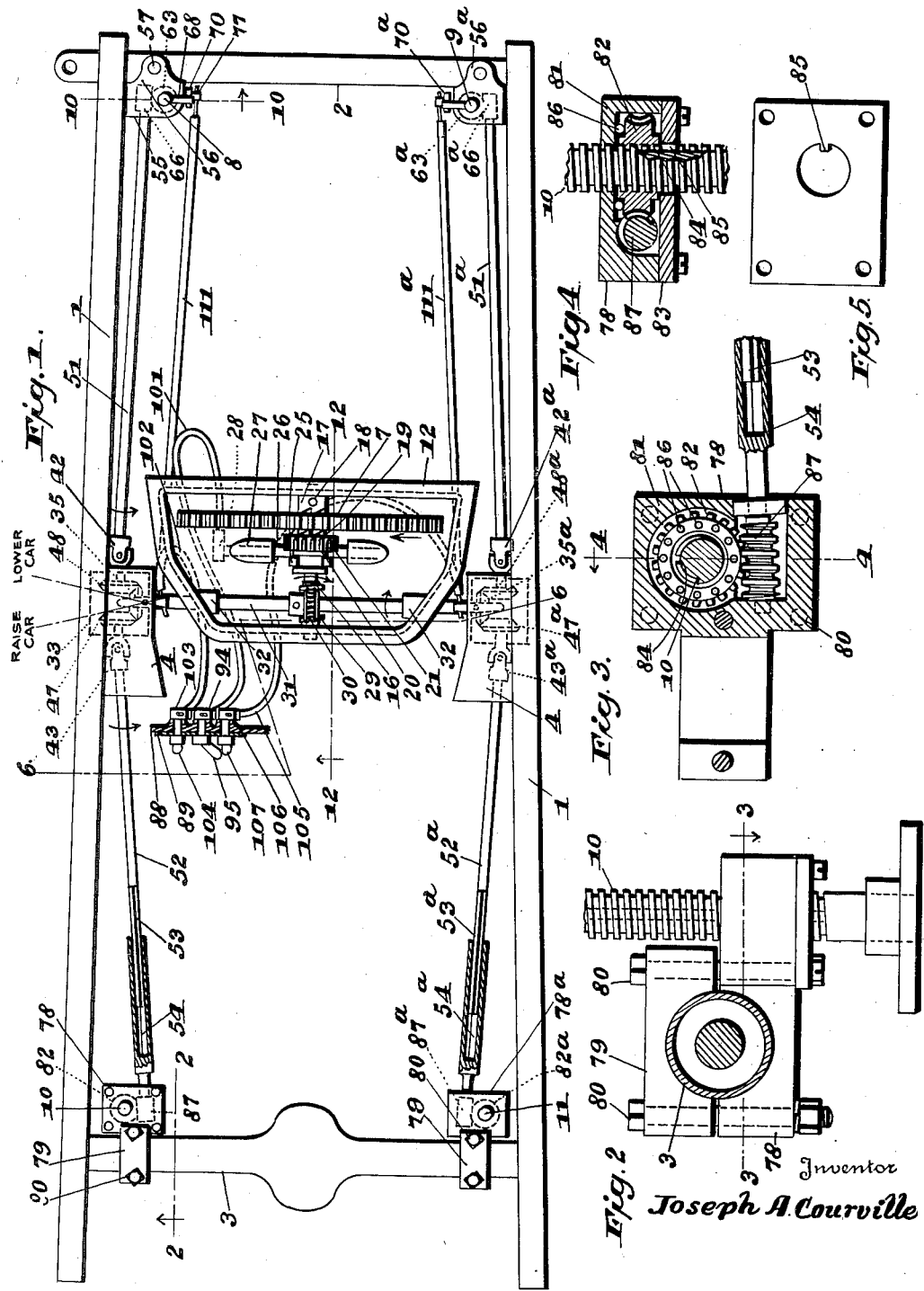
Inventor
Joseph A. Courville
By Munn, Anderson & Liddy March 5, 1940.  J. A. COURVILLE  2,192,767
JACKING APPARATUS
Filed Jan. 6, 1938  3 Sheets-Sheet 2
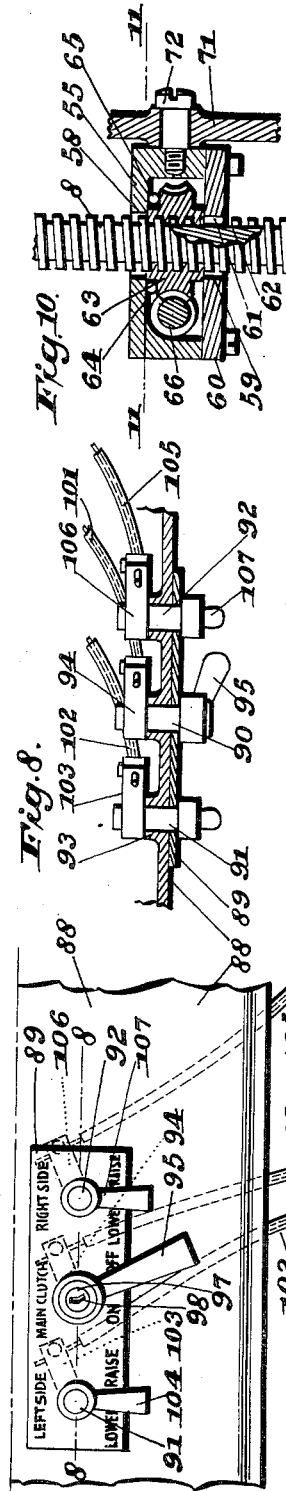
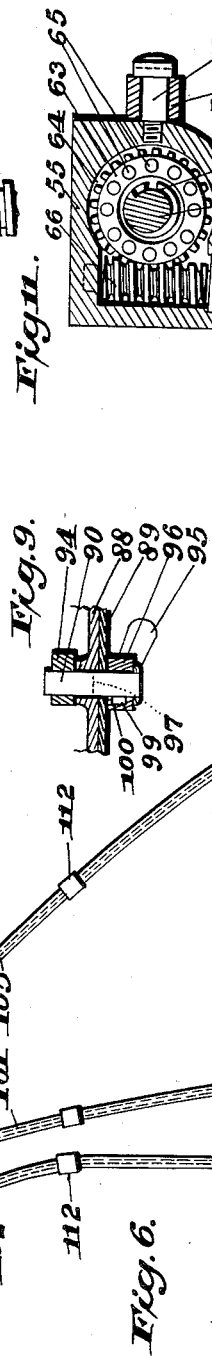
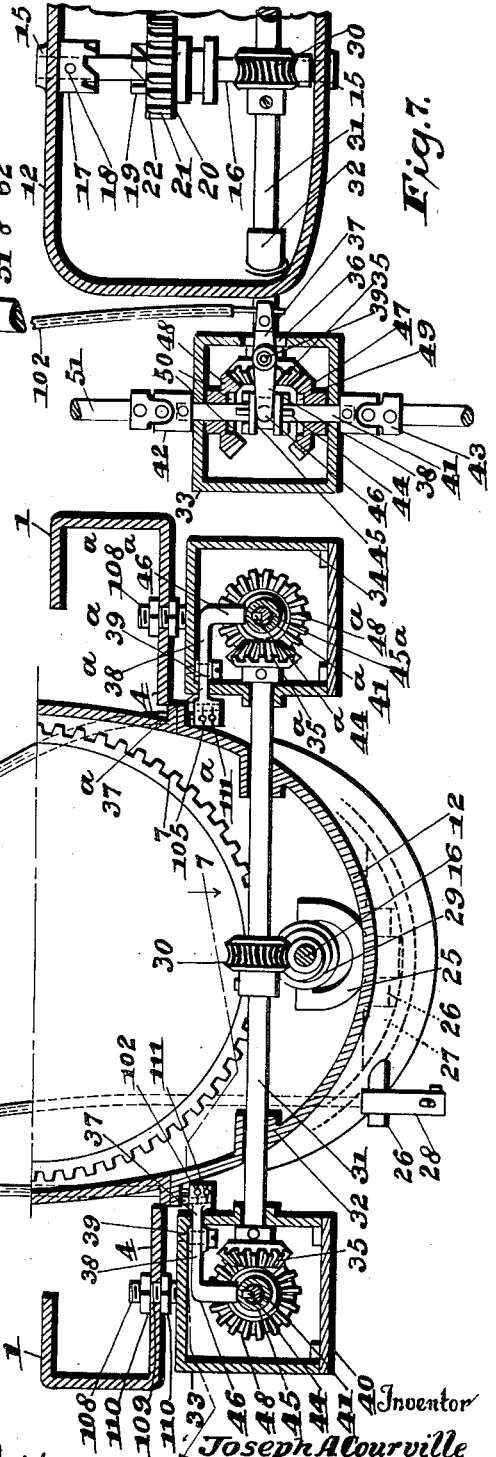
Inventor
Joseph A Courville
By Munn, Anderson & Liddy March 5, 1940.    J. A. COURVILLE    2,192,767
JACKING APPARATUS
Filed Jan. 6, 1938    3 Sheets-Sheet 3
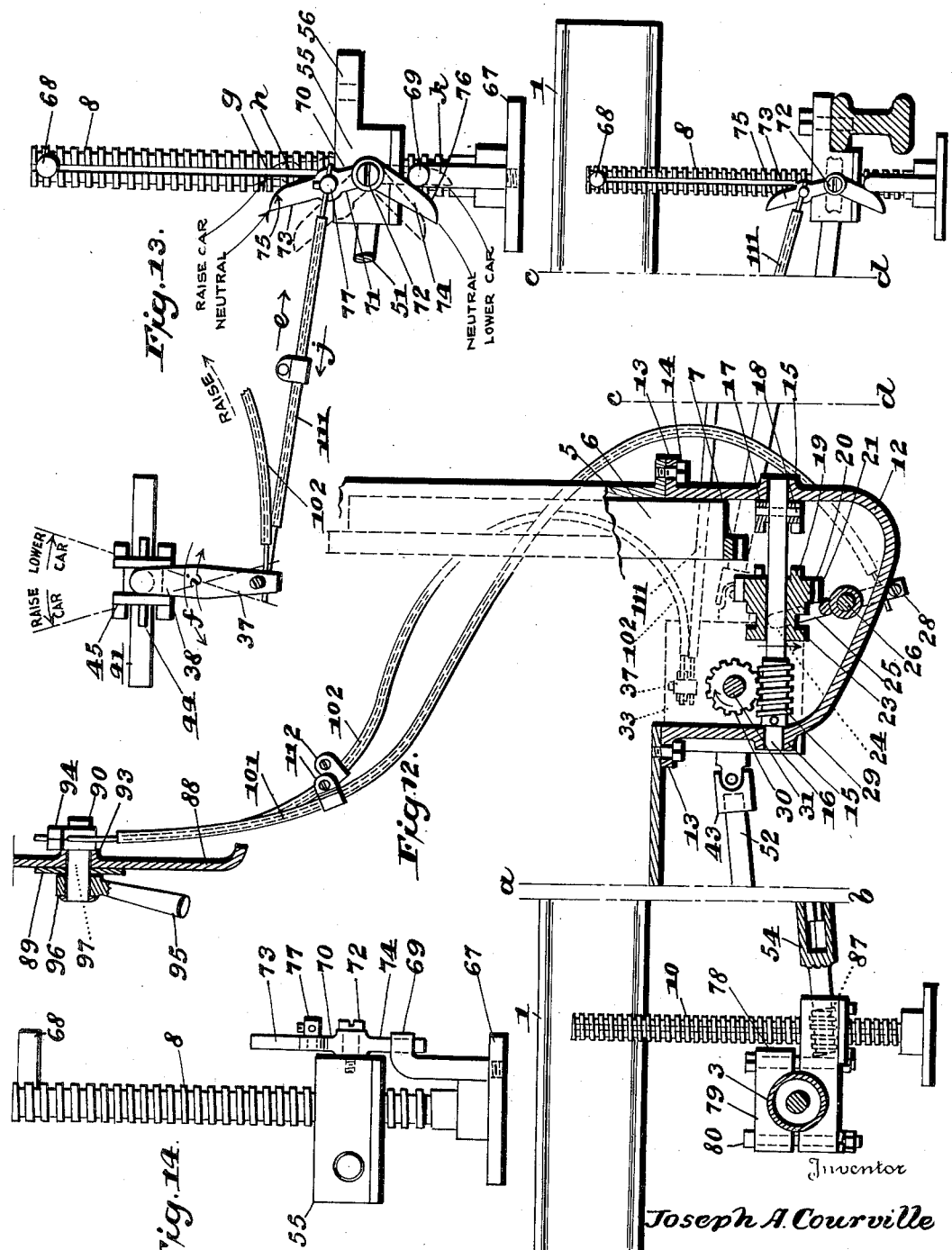

Patented Mar. 5, 1940

2,192,767

UNITED STATES PATENT OFFICE 2,192,767

JACKING APPARATUS

Joseph A. Courville, Marlboro, Mass., assignor to Alice A. Courville, Marlboro, Mass.

Application January 6, 1938, Serial No. 183,708

5 Claims. (Cl. 254—86)

This invention relates to improvements in automotive equipment, especially in jacking apparatuses therefor. The modern trend toward building automobiles, particularly passenger automobiles, with frames and bodies of low centers of gravity has introduced the problem of devising jacks which are sufficiently low to enable getting them under the axles in order that the frame may be raised from the ground sufficiently far for the removal of a wheel.

This condition has led to the development of what is known as the bumper jack, which is a more or less well known contrivance for exerting the jacking pressure either beneath the bumper or one of its carrying brackets. Although this is an improvement, yet the use of this type of jack involves the hazard of the car dropping in the event of an initially loose bumper bracket letting go.

The herein disclosed invention is regarded as an improvement over both the old and more modern types of jacks, totally eliminating the disagreeable duty of having to handle an ofttimes dirty jack and subjecting one's self to the disagreeable physical task of manipulating the jack for raising and lowering the car. This same improvement makes provision for raising the entire side of a car, thus avoiding having to shift a jack from the front to the rear end in case both wheels need to come off.

A further provision makes it possible to raise the entire car from the floor or ground so as to enable the operator to have easy access to all of the nethermost parts in the event that garage work is to be done on them.

With this preamble in mind the objects of the invention are as follow:

First, to provide a jacking apparatus which enables the uniform raising and lowering of the entire side of a car, thereby avoiding twisting, distorting and perhaps injuring the frame, as is the possibility with the use of the currently known single jack with which only one corner of the car can be raised.

Second, to provide for the bodily raising and lowering of the car from the ground or a garage floor so as to enable easy access to all of the nethermost parts.

Third, to provide for the operation of the jacking apparatus by utilizing the engine of the car, and to provide an instrument-board control by means of which the raising and lowering can be done while the operator remains seated behind the wheel.

Fourth, to provide a balanced setting of the cross and jack shafts, insuring an even distribution of the driving forces at each of the four jacks.

Fifth, to provide an adjustable suspension for the side gear junction boxes enabling any necessary resetting of said boxes in respect to the frame in the event of the frame ever sagging or being knocked out of true position.

Sixth, to provide for the automatic throw-out of the jack gearing when the limits of raising and lowering motion are reached.

Other objects and advantages will appear in the following specification, reference being had to the accompanying drawings, in which:

Figure 1 is a plan view, parts being shown in section, of an automobile frame embodying the improved jacking apparatus.

Figure 2 is a cross section taken on the line 2—2 of Fig. 1.

Figure 3 is a horizontal section taken on the line 3—3 of Fig. 2.

Figure 4 is a cross section taken on the line 4—4 of Fig. 3.

Figure 5 is a plan view of the bottom cover plate of one of the rear gear boxes.

Figure 6 is a section taken on the line 6—6 of Fig. 1, a portion of the instrument board being shown in elevation.

Figure 7 is a detail horizontal section taken on the line 7—7 of Fig. 6, parts being shown in plan.

Figure 8 is a section taken on the line 8—8 of Fig. 6.

Figure 9 is a detail sectional view of the main clutch lever.

Figure 10 is a cross section taken on the line 10—10 of Fig. 1.

Figure 11 is a horizontal section taken on the line 11—11 of Fig. 10.

Figure 12 is a longitudinal section taken on the line 12—12 of Fig. 1, parts being shown in elevation, the various portions of the view to be read as connected at the lines a b, c d.

Figure 13 is a diagrammatic view partly illustrating the automatic throw-out.

Figure 14 is an elevation of the left front jack.

The frame of the automobile is designated 1. The front axle 2 and the rear axle housing 3 are shown in a general way only. The frame 1 includes a pair of inwardly extended plates 4 (Fig. 1) which, if not already part of the original automobile equipment, may be conveniently added to serve as suspension plates for the side gear junction boxes (Fig. 6).

A portion of the fly wheel housing is indicated at 5 (Fig. 12). The fly wheel is shown at 6. This, obviously, is driven by the engine (not shown), and it includes a permanently affixed ring gear 7 which is conveniently employed as the source of power for the four jacks 8, 9, 10 and 11, (Fig. 1).

The improvement contemplates the addition of a casing 12 to the housing 5 (Fig. 12) which casing is necessarily specially designed to suit the needs of the driving mechanism contained thereby. Said casing has a flange 13 through which bolts 14 are inserted and screwed in holes already present in the flange of the housing 5. The installation of this part of the improvement merely requires removing the existing bell from the fly wheel housing 5 and substituting the modified casing 12.

The latter is made with bearings 15 to support a clutch shaft 16. This shaft is situated beneath the ring gear 7. It has a clutch member 17 secured to it by a pin 18 or some suitable equivalent. A clutch element 19 is slidably mounted on the shaft 16. It is perfectly loose on the shaft, there not being any spline to slidably key it in place.

Said clutch element has a pinion 20 which is adapted to be meshed with the ring gear 7 while the latter is in motion. The front ends of the pinion teeth 21 (Fig. 7) are bevelled at 22. This facilitates the meshing of the pinion with the gear and tends to prevent any rasping of or undue strain upon the respective teeth. A groove 23 in the clutch element 19 contains the fingers 24 of a shifting fork 25. Said fork is attached to a fork shaft 26. This shaft is journalled in bearings 27 and one exposed end of it carries an arm 28 (Fig. 6). Reverting to the clutch shaft 16 (Fig. 12), this carries a permanently affixed worm pinion 29 which is in mesh with a worm gear 30 on a cross shaft 31, (Figs. 1 and 6). This shaft is journalled in bearings 32 on the casing 12, and is long enough so that its ends project into the side gear junction boxes 33, 34. These ends of the cross shaft carry permanently affixed bevel driver pinions 35.

Inasmuch as the structure of both boxes 33, 34 is alike, the following description is applied only to the left junction box 33. The same reference numerals are used for corresponding parts in the right junction box 34, but are distinguished by the exponent letters a. Attention is directed to Fig. 7. The left junction box 33 is slotted on the inner side near the top at 36. The arm 37 of a clutch lever 38 projects through this slot. Said lever is pivoted upon a screw 39 (Fig. 6) which is driven into the top of the box. Access is had to the interior through a bottom opening which is kept closed by a cover plate 40.

A main jack shaft 41 (Fig. 7) is suitably journalled in the box 33. It has universal joints 42, 43 secured to its exposed front and rear ends. These are attached to the shaft so close to the ends of the box that endwise motion of the shaft is prevented. A spline 44 keeps the double clutch 45, which is slidably mounted on the shaft 41, from turning relatively to the shaft. The finger 46 (Fig. 6) of the lever 38 extends into the groove of the clutch and it is by rocking the lever on its pivot 39 that the clutch 45 is shifted either rearwardly to cause raising of the left side of the car, or forwardly to cause said side to be lowered again.

These operations are accomplished by bevel gears 47, 48 which are in constant mesh with the driver pinion 35. The gear 47 is the raising gear and 48 is the lowering gear. These gears are loose on the shaft 41. They are capable of turning independently of the shaft. The respective gears have teeth 49, 50 (Fig. 7). When the clutch 45 is shifted rearwardly so that its teeth engage the teeth 49, the gear 47 is locked to the main jack shaft 41 to cause the previously mentioned raising of the left side of the car.

The gears 47, 48 are only part of the foregoing raising and lowering means. Extension shafts 51, 52, are directed forwardly and backwardly to operate the front and rear jacks 8, 10. The shaft 52 is made with a square end 53. This is slidably fitted in the correspondingly internally shaped sleeve 54. This arrangement provides a slip connection which compensates for the usually considerable motion and change of position of the rear axle housing 3 with respect to the frame 1. Such a slip connection is thought not to be necessary in the forward shaft extension 51, but is readily added if needed.

Respecting the front jack 8, the structure is as follows, it being again noted that the correspondingly identical structure of the right front jack 9 is designated by the same reference characters which have the exponent letters a. The front gear box 55 (Figs. 1 and 10) has a bracket 56 (Fig. 1) which is emplaced on top of the front axle 2 and secured there by a bolt 57. The top of the gear box has an opening 58 (Fig. 10) through which the jack 8 extends. There is a similar opening 59 in the bottom cover plate 60, but this opening is made with an inward projection 61 which forms a key. This key occupies a longitudinal slot 62 in the side of the jack 8. The latter is thus prevented from turning, but it is worked down and up in the raising and lowering operations.

A worm gear 63 carries the jack 8 (Fig. 10). This worm gear occupies the chamber 64 in the box 55. A thrust bearing 65 of a suitable type is interposed between the top of the gear 63 and the roof of the chamber 64. A worm pinion 66 meshes with and drives the gear 63 (Fig. 11). This pinion is fixedly carried by the forward shaft extension 51. Thus it will be seen that when the extension 51 is rotated in the proper direction, a driving of the worm gear 63 will result, causing the jack 8 to move as stated.

This jack, as well as each of the other three so called jacks, is actually a steel shaft with a heavy square thread. Its lower end carries a ground pad 67 (Figs. 13 and 14). The ground pad is attached in any desired way. It may be made round or square, and its nether surface can be roughened, or not.

At this point note is made of pins 68, 69 (Fig. 14) respectively near the top and bottom of the jack 8. These pins actuate the automatic throw-out 70 (Fig. 13). This throw-out involves the use of a lever 71 which is pivoted on the box 55 upon a screw 72 driven into the box (Fig. 10). The lever 71 has upper and lower heels 73, 74 which are curved away to form cam surfaces 75, 76. The heel 73 carries a swivelled stud 77.

Although the rear gear box 78 (Fig. 1) is the same in principle as the front gear box 55, yet there are slight structural differences, the description of which follows. This gear box has a clamp plate 79 (Fig. 2) through which box 78 and plate the bolts 80 are inserted to affix the gear box to the rear axle housing 3. A chamber 81 (Fig. 4) houses the worm gear 82. Both the box 78 and its cover 83 have openings for the jack screw 10. The latter has a longitudinal slot 84 in which rides the key 85 of the cover. A thrust bearing 86 supports the strain of raising the car. A worm pinion 87 meshes with the gear 82. This pinion is carried by the sleeved portion of the extension shaft 52. Thus it will be understood that when the double clutch 45 (Fig. 7) is shifted either rearwardly or forwardly in respect to the car, the various worm gearings operate the jacks 8, 10 simultaneously, thereby either raising or lowering the car. It is necessary for the engine to be in operation in order that power may be derived from the ring gear 7.

Attention is now directed to Fig. 6 for the instrument board control. The instrument board is designated 88. This has a name plate 89 attached to it bearing the wording illustrated. Three short shafts 90, 91 and 92 (Fig. 8) are journalled in openings through the name plate in instrument board. The latter has bosses 93 to lengthen the bearing surfaces. The shaft 90 is the main clutch shaft. It has a fixedly secured arm 94 on its inner end and a loosely attached lever 95 on its outer end. The head 96 of this lever turns freely on the shaft but the shaft has a lock cylinder 97 embodied in it. When an appropriate key is inserted in the hole 98 (Fig. 6) a turn in the proper direction throws the bolt 99 (Fig. 9) into a recess 100 in the head 96. This locks the shaft 90 and lever 95 together so that a turn of the shaft by means of the lever will swing the arm 94 either down or up to engage or disengage the clutch element 19.

This motion is transmitted by a Bowden wire 101, the ends of which are clamped to the respective arms 28, 94. A similar Bowden wire 102 has its ends clamped to the left clutch lever 38 and an arm 103 (Fig. 8) on the inner end of the left clutch shaft 91. This shaft has a handle 104. Right and left turns of the shaft 91 by means of said handle either pull or push the Bowden wire to rock the lever 38 counterclockwise or clockwise, thereby to engage either the gear 47 or 48 so that the car is raised or lowered. A third Bowden wire 105 has its ends clamped to the clutch lever 38a (Fig. 6) and to an arm 106 on the inner end of the right clutch shaft 92. This shaft has a handle 107 which is adapted to be moved right or left to cause raising or lowering of the car.

A Bowden wire 111 (Fig. 13) has its ends clamped to the clutch arm 37 and to the swiveled stud 77. The pushing and pulling motions of the Bowden wire 102 are transmitted directly to the lever 71 so that it changes its positions in agreement with the various dotted lines. The customary wire sheaths of the Bowden wires are secured to adjacent parts of the automobile by clamps 112. A sufficient number of clamps will be used to properly hold the sheaths.

By reference to Fig. 6 it is seen that the gear box 33 (also the gear box 34) has a threaded stud 108 which goes up through a hole 109 in the plate 4. Nuts 110 are screwed on the stud 108, there being one on each side of the plate. Should there be such a change in the position of the frame 1 in reference to the casing 12 as will throw a strain on the cross shaft 31 because of its being carried by the bearings 32 of the casing, the nuts 110 will be loosened and turned either up or down so as to raise or lower the box 33 as may be needed. This adjustment is an important provision because by means of it the cross shaft 31 is kept turning freely in its bearings.

The operation is readily understood. Upon insertion of the key in the hole 98 (Fig. 6) and prior to turning it, the lever 95 is shifted slightly right. The key is then turned so as to project the bolt 99 (Fig. 9) into the recess 100 and thus secure the head 96 to the shaft 90. A movement of the lever to the left turns the shaft 90 clockwise, pushes the Bowden wire 101, turns the arm 28 (Fig. 12) clockwise, and moves the clutch element 19 toward the member 17. The pinion 20 engages the ring gear 7. The beveled teeth (Fig. 7) facilitate the engagement. Motion is thus imparted to the clutch element 19. As soon as the clutch member 17 is engaged by said element, the turning motion is imparted to the clutch shaft 16. The worms 29, 30 rotate the cross shaft and its pinions 35, 35a.

If it is desired to raise the left side of the car the handle 104 is moved to the right (Fig. 6). The resulting pull on the Bowden wire 102 causes the left clutch lever 38 to move the double clutch 45 (Fig. 7) into engagement with the bevel gear 47. The main jack shaft 41 and its extensions 51, 52 are then rotated in such a direction as will feed the front and rear jacks 8, 10 down. At this point attention is directed to Fig. 13. The Bowden wire 111 was moved forward (arrow e) when the clutch lever 38 was turned (arrow f) to cause the raising of the car. The lever 71 was moved from its full line neutral position to the dotted line raised position g. This change of position places the heel 73 in the path of the pin 68. When the jack 8 lowers until the pin 68 reaches the position h, the engagement of said pin with the cam surface 75 replaces the lever 71 to its full line neutral position, reversing the previous motion in each of the Bowden wires 111, 102 and restoring the handle 104 to the central and starting position (Fig. 6).

This action of the lever 71 also moves the double clutch 45 to its centralized position. The main jack shaft 41 and its extension shafts are stopped. Both jacks 8 and 10 are in the lowered positions, and will have raised the left side of the car by their engagement with the ground.

The reverse operation occurs when the handle 104 has moved to the left (Fig. 6). The resulting push of the Bowden wire 102 turns the left clutch lever 38 clockwise (arrow i, Fig. 13) and pulls the Bowden wire 111 (arrow j). The lever 71 is set so that its heel 74 occupies the lower position k. At this time the pin 69 is down near the ground, and when the jack is raised high enough in the lowering action of the car to bring the pin 69 against the cam surface 76, the resulting action is to reset the lever 71 to the full line neutral position. The pull on the Bowden wire 111 (arrow e, Fig. 13) restores the clutch 45 to the central position and stops both jacks.

It is to be noted that the automatic throw-out 70 (Fig. 13) occurs only on the front jacks 8, 9. None is necessary on the rear jacks because the function would merely be duplicated. All operations described with respect to the left side of the car apply to the mechanism on the right side. The final act will be to restore the clutch lever 95 (Fig. 6) to the "off" position. The key is withdrawn.

I claim:
1. In combination with the flywheel housing, ring gear and frame of an automobile, a cross shaft having at least one end gear, means by which said shaft is driven from the ring gear, a casing containing said means, being affixed to said housing, and providing bearings for said cross shaft, a jack mounted on the frame and gearing for said jack, said gearing being in mesh with the end gear, a junction box containing said gear and gearing, and means both suspending said box from the frame and being adjustable to compensate for any change of position of the frame with reference to said casing.

2. A jacking apparatus comprising a jack screw, a mount by which the jack screw is attached to an axle of an automobile, gearing embodied in the mount in driving connection with the jack screw, driving means for the gearing, a lever for activating and neutralizing the driving means, a throw-out lever and means pivoting it to said mount, a connection from said throw-out to the actuating lever, said throw-out including a pair of heels, and pins on the approximate extremities of the jack screw, each engaging the respective heel to rock the throw-out and shift the actuating lever.

3. In automotive vehicle jacking apparatus, a ring gear and a housing for the flywheel carrying said ring gear, a clutch shaft parallel to the axis of the ring gear, a cross shaft located transversely of the clutch shaft, said shafts being intergeared and said cross shaft having means at its ends adapted for jack operation, a clutch member secured to and revoluble with the clutch shaft, a casing supporting the clutch and cross shafts, being secured to the housing to locate the clutch member permanently at one side of the ring gear, and an unsplined clutch element slidable on the clutch shaft, having both gear and clutch teeth to simultaneously engage the ring gear and clutch member.

4. In automotive vehicle jacking apparatus, a ring gear and a housing for the flywheel carrying said ring gear, said flywheel running close to one wall of the housing and spacing the ring gear from said wall, a clutch shaft parallel to the axis of the ring gear, a cross shaft located transversely of the clutch shaft, said shafts being intergeared and said cross shaft having means at its ends adapted for jack operation, a clutch member secured to one end of the clutch shaft, a casing supporting the clutch and cross shafts, being secured to the housing to locate the clutch member in the space between said wall and the ring gear, and a clutch member loose on the clutch shaft, being slidable toward and from the flywheel and having peripheral gear teeth and coaxial clutch teeth to respectively and simultaneously engage the ring gear and clutch member.

5. In jacking apparatus, a self-contained driven unit attachable to the flywheel housing of a motor vehicle, said unit comprising a casing into which a portion of a ring gear on said flywheel is extensible when said attachment is made, a pair of shafts journaled in said casing in crossed relationship, one of said shafts being a clutch shaft and parallel to the axis of the flywheel, intergearing between said shafts including a pinion on the clutch shaft secured at one end thereof to abut one wall of the casing, a clutch member on said clutch shaft secured at the other end thereof to abut an opposite wall of the casing, said pinion and clutch member thus preventing end movement of the clutch shaft, and a clutch element loose on the clutch shaft, having both gear and clutch teeth respectively and simultaneously to engage the ring gear and clutch member.

JOSEPH A. COURVILLE.